Dec. 20, 1960

A. E. MEDFORD ET AL 2,965,752

SUPERHETERODYNE RADIO RECEIVERS

Filed Oct. 13, 1958

INVENTORS
ALBERT ERNEST MEDFORD
GEORGE WILLIAM SAPSWORTH GRIFFITH
BY Kirschstein, Kirschstein & Ottinger
ATTORNEYS United States Patent Office 2,965,752
Patented Dec. 20, 1960

2,965,752

SUPERHETERODYNE RADIO RECEIVERS

Albert Ernest Medford, Coventry, and George William Sapsworth Griffith, Leamington Spa, England, assignors to The General Electric Company Limited, London, England Filed Oct. 13, 1958, Ser. No. 766,764

Claims priority, application Great Britain Oct. 15, 1957

3 Claims. (Cl. 250—20)

This invention relates to superheterodyne radio receivers.

In a superheterodyne radio receiver, the received radio frequency signal is heterodyned with a locally generated oscillation to derive an intermediate frequency signal. For that purpose the received signal and the locally generated oscillation may be added together to provide a composite signal which is fed over a common path to a frequency changer in the form of a crystal or other non-linear impedance element. With such an arrangement, it is found that the frequency changer may generate spurious signals and supply those signals to the common path. The most pronounced spurious signal is usually the image signal which is a signal carrying the same intelligence as the received signal and which occupies a band of frequencies equally spaced from the frequency of the locally generated oscillation as the band of the received signal but on the opposite side of that frequency.

Spurious signals generated in this manner are generally undesirable and one object of the present invention is to provide an arrangement which is adapted to filter off such spurious signals.

In a superheterodyne radio receiver which is in accordance with the present invention and in which a frequency changer is arranged to derive an intermediate frequency signal by heterodyning together the received signal and a locally generated oscillation which are supplied to the frequency changer over a common path, first and second paths, each of which includes a filter, are provided for supplying the received signal and the locally generated oscillation to the said common path respectively, the first and second paths joining the said common path at the same point and the arrangement being such that the second path is arranged to present to the said common path at the said point a substantially lower impedance to spurious signals generated by the frequency changer than the first path whereby the spurious signals are at least partially filtered off over the second path.

It will be appreciated that the three paths referred to in the last paragraph need not necessarily be physically distinct transmission lines since the transmission line forming at least part of one of the two paths for supplying the received signal and the locally generated oscillation respectively to the common path may be integral with the transmission line forming the common path. Alternatively the two paths may be constituted in the region of the said point by a single length of transmission line to which is joined a transmission line forming the common path.

A superheterodyne radio receiver which is in accordance with the present invention and which is for use at frequencies in the region of 2,000 megacycles per second will now be described by way of example with reference to the two figures of the accompanying drawings in which.

Figure 1:
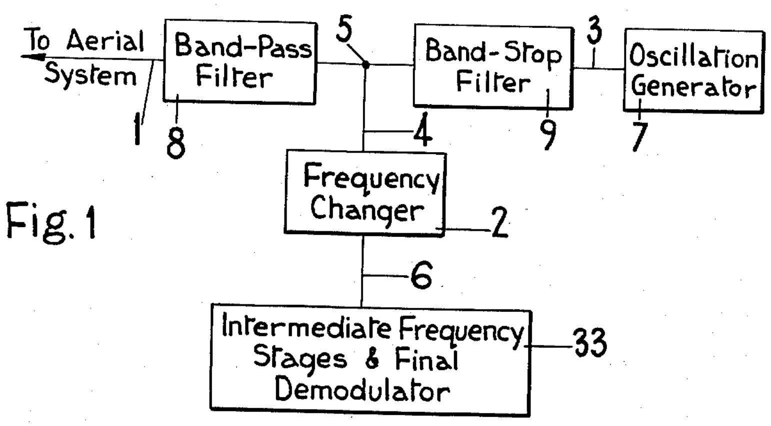
Figure 1 shows the receiver diagrammatically.

Referring now to Figure 1, the received signal, possibly after amplification, is fed by way of a path 1 to a frequency changer 2 where it is heterodyned with a locally generated oscillation for the purpose of deriving an intermediate frequency signal having a frequency of the order of 70 megacycles per second. In fact the frequency changer 2 operates by heterodyning the received signal with a locally generated oscillation which is supplied over a path 3 and then selecting the lower sideband.

The locally generated oscillation is supplied by any suitable apparatus 7 although a preferred example is the apparatus described in the complete specification of copending United States patent application Serial No. 744,266, filed June 24, 1958, for Frequency Multiplying Apparatus by Bernard Wilson and assigned to the assignee of the instant application.

The paths 1 and 3 are connected to one end of a path 4 at the point 5 and the paths 1, 3 and 4 are all formed of co-axial transmission line. The end of the path 4 remote from the point 5 is connected to the frequency changer 2.

The frequency changer 2 is of the well known type which comprises a silicon rectifier element (not shown) connected across one end of a length of co-axial transmission line (not shown) over which is supplied, during use, a composite signal consisting of the received signal and the locally generated oscillation. This length of line constitutes part of the path 4 in Figure 1. The rectifier element is in the form of a generally cylindrical insert or "cartridge" which is mounted to lie in line with the inner conductor of the said transmission line. The intermediate frequency signal which is developed across the said rectifier element is taken from the frequency changer 2 by way of a further co-axial transmission line 6 and is supplied to the intermediate frequency stages and the first demodulator of the receiver which are represented in Figure 1 by the rectangle 33.

A bandpass filter 8 is provided in the path 1 and a bandstop filter 9 is provided in the path 3. The electrical distance between the point 5 and each of these filters 8 and 9 is approximately a quarter wavelength at the operating frequency of a receiver.

The filter 8 is arranged so that the frequency of the received signal lies in the pass band of the filter while the frequency of the locally generated oscillation is outside this passband as also are the frequencies of the image signal and other spurious signals generated by the frequency changer 2. Thus at the frequency of the locally generated oscillation and at the frequencies of the spurious signals, the path 1 presents a relatively high impedance to the point 5.

The stopband of the filter 9 approximately corresponds to the passband of the filter 8. The filter 9 is thus able to pass the locally generated oscillation and the path 3 thus presents to the point 5 a relatively high impedance at the frequency of the recived signal and a relatively low impedance at the frequencies of the spurious signals generated by the frequency changer 2.

The arrangement is therefore such that the major portion of any spurious signals generated by the frequency changer 2 and supplied thereby to the path 4 is passed by the filter 9 and is not reflected back to that path. It will, of course, be realised that, in order to ensure that signals passed through the filter 9 to the apparatus 7 are absorbed thereby and not reflected, the path 3 must be terminated by the appropriate resistive impedance. In order to satisfy this requirement and particularly if the apparatus 7 is as described in the said copending patent application, an additional branching filter (not shown) with a resistive termination may be provided between the apparatus 7 and the filter 9.

The filters 8 and 9 are preferably in accordance with British Patent No. 659,812 and may be in accordance with British Patent No. 696,394. The construction of one example of a filter arrangement to provide the filters 8 and 9 is shown in Figure 2 of the accompanying drawings.

Figure 2:
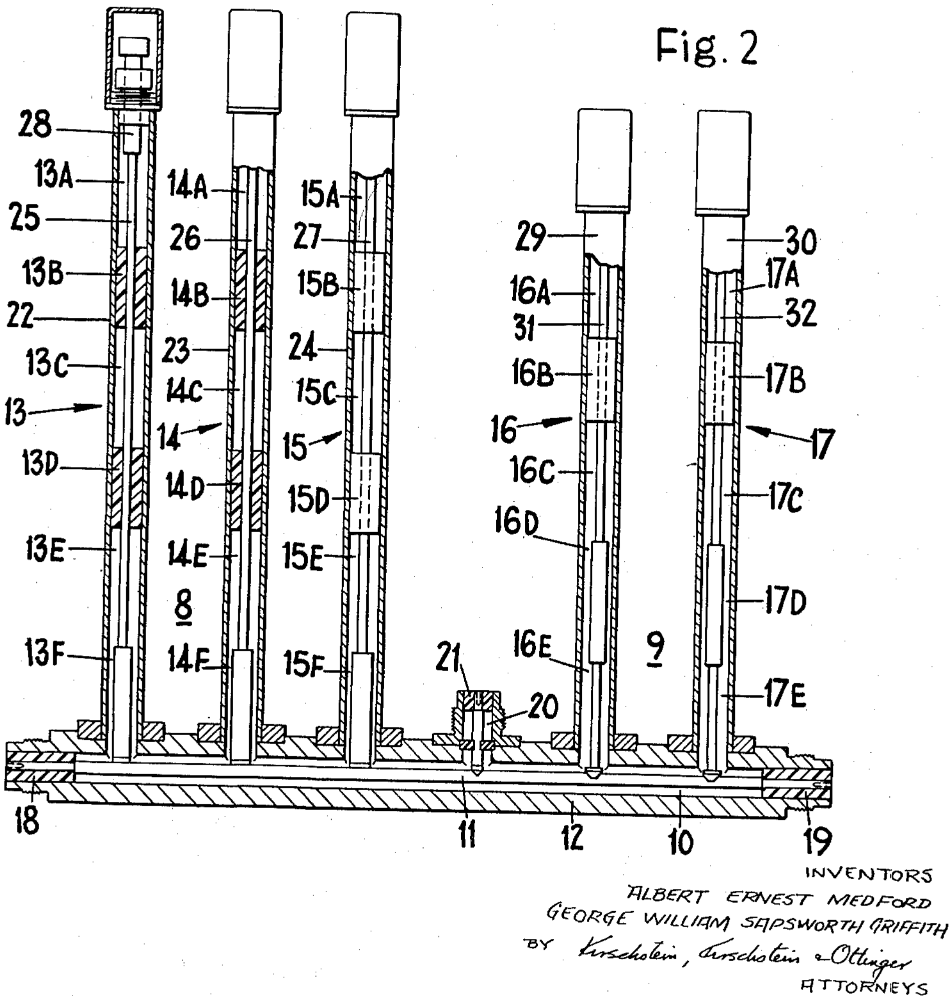
Figure 2 is a cross-sectional elevation of a filter arrangement including the two filters shown in Figure 1.

Referring now to Figure 2, the filter arrangement comprises a length 10 of co-axial transmission line, this line being made up of an inner conductor 11 and an outer conductor 12. Three co-axial stub lines 13, 14 and 15 are connected to the line 10 so as to constitute the bandpass filter 8 while two co-axial stud lines 16 and 17 are connected to the line 10 to provide the bandstop filter 9. The line 10 thus constitutes part of each of the paths 1 and 3 (not shown) and at the ends thereof are connected two lengths (not shown) of co-axial transmission line by way of couplings 18 and 19.

A further short length 20 of co-axial transmission line is connected to the line 10, this length 20 forming part of the path 4 (Figure 1), there being a coupling 21 at the end of this length of line remote from the line 10.

The three stub lines 13, 14 and 15 comprise metal tubes 22, 23 and 24 which are of uniform cross-section and which constitute the outer conductors of the stub lines and inner conductors 25, 26 and 27 respectively. Each of the stub lines 13, 14 and 15 is in fact made up of six sections and these sections are referenced in the drawing with the suffixes A, B, C, D, E and F respectively. The conductors 25, 26 and 27 are of uniform cross-section throughout the sections A, B, C, D and E of the stub lines 13, 14 and 15 while the portions of there conductors in the sections 13F, 14F and 15F are of a greater cross-section. The sections A, C, E and F of these three stub lines have air as dielectric while the sections B and D have polyethylene as dielectric. Each of the sections 13A, 14A and 15A is provided with a metal member, such as the member 28, which is arranged to screw into the closed end of the appropriate metal tube 22, 23 or 24 for the purpose of varying the capacity termination of the stub line and thereby tuning that line.

Similarly the two stub lines 16 and 17 of the bandstop filter 9 are formed by two metal tubes 29 and 30 which constitute the outer conductors of these lines and inner conductors 31 and 32. Each of these two stub lines is made up of five sections which are referenced with the suffixes A, B, C, D and E respectively in the drawing and in this case, the inner conductors 31 and 32 are of uniform cross-section throughout sections A, B, C and E but are of increased cross-section in the sections 16D and 17D. The sections 16B and 17B have polyethylene as the dielectric material while all the remaining sections of these two stub lines have air as dielectric.

The dimensions of the filter arrangement for it to operate correctly with a received signal having a frequency of 2,000 megacycles per second and a locally generated oscillation having a frequency of 1930 megacycles per second are listed below:

| | Inches |
|---|---|
| Diameter of conductor **11** | 0.156 |
| Inside diameter of conductor **12** | 0.437 |
| Spacing of adjacent pairs of stub lines **13**, **14** and **15** | 1.44 |
| Spacing of stub lines **15** and line **20** | 1.44 |
| Spacing of line **20** and stub line **16** | 1.44 |
| Spacing of stub lines **16** and **17** | 1.44 |
| Inside diameter of tubes **22**, **23**, **24**, **29** and **30** | 0.437 |
| Diameter of conductors **25**, **26** and **27** in sections A to E of stub lines **13**, **14** and **15** | 0.125 |
| Diameter of conductors **25** and **27** in stub line sections **13F** and **15F** | 0.290 |
| Diameter of conductor **26** in stub line section **14F** | 0.307 |
| Length of portion of inner conductor **25** in stub line sections **13A**, **14A** and **15A** | 1.24 |
| Length of sections B and D of stub lines **13**, **14** and **15** | 0.960 |
| Length of sections C and E of stub lines **13**, **14** and **15** | 1.44 |
| Length of stub line sections **13F**, **14F** and **15F** | 1.290 |
| Diameter of conductors **31** and **32** in sections A, B, C and E of stub lines **16** and **17** | 0.125 |
| Diameter of conductors **31** and **32** in sections **16D** and **17D** | 0.240 |
| Length of portion of inner conductors **31** and **32** in stub line sections **16A** and **17A** | 1.24 |
| Length of stub line sections **16B** and **17B** | 0.960 |
| Length of stub line sections **16C** and **17C** | 1.44 |
| Length of stub line sections **16D** and **17D** | 1.44 |
| Length of stub line sections **16E** and **17E** | 1.24 |

We claim:

1. In a superheterodyne radio receiver comprising an input path for the transmission of an input signal which is supplied to the receiver and which is in a particular frequency range: an oscillation generator, a frequency changer, means to combine the input signal on said input path with an oscillation supplied by the oscillation generator and to supply the combined signal to the frequency changer which serves to heterodyne the input signal and the oscillation supplied by the oscillation generator to give a required intermediate frequency signal and an unwanted spurious signal having a frequency that lies on the opposite side of the frequency of the oscillation supplied by the oscillation generator and is separated therefrom by the intermediate frequency, and means connected to the frequency changer to demodulate the intermediate frequency signal supplied thereby, said means to combine an input signal with an oscillation supplied by the oscillation generator comprising a bandpass filter which has a pass band containing the frequency range of the input signal while the frequency of the spurious signal and the frequency of the oscillation supplied by the oscillation generator are outside this pass band, means to connect the input path and the bandpass filter, a bandstop filter which has a stop band containing the frequency range of the input signal while the frequency of the spurious signal and the frequency of the oscillation supplied by the oscillation generator are outside this stop band, a connection between the oscillation generator and the bandstop filter, and a three-way connection between the bandpass filter, the bandstop filter and the frequency changer, the transmission characteristics of the bandpass and bandstop filters at the frequency of the spurious signal generated by the frequency changer causing that signal to be at least partially filtered off via the bandstop filter.

2. A combination as set forth in claim 1 wherein the three-way connection comprises a first length of transmission line, means to connect the two ends of the first length of transmission line to the bandpass filter and to the bandstop filter respectively, a second length of transmission line, means to connect one end of the second length of transmission line to the first length of transmission line at a point along that line, and means to connect the other end of the second length of transmission line to the frequency changer.

3. A combination as set forth in claim 1 wherein the three-way connection comprises three sections of coaxial transmission line, means to connect together one end of each of the three transmission lines, and means to connect the other ends of the three transmission lines to the bandpass filter, the bandstop filter and the frequency changer respectively.

References Cited in the file of this patent

UNITED STATES PATENTS

| | | |
|---|---|---|
| 2,131,976 | Schaper | Oct. 4, 1938 |
| 2,455,657 | Cork et al. | Dec. 7, 1948 |
| 2,713,152 | Brown | July 12, 1955 |
| 2,819,391 | Reiches | Jan. 7, 1958 |
| 2,824,965 | Chalmers | Feb. 25, 1958 |
| 2,833,994 | Pipes et al. | May 6, 1958 |